United States Patent [19]
Grimshaw

[11] 4,009,782
[45] Mar. 1, 1977

[54] METHOD AND APPARATUS FOR SORTING AND COUNTING FISH EGGS

[75] Inventor: Derald Edward Grimshaw, Denver, Colo.

[73] Assignee: Roe, Inc., Palmyra, Wis.

[22] Filed: Sept. 26, 1975

[21] Appl. No.: 616,872

[52] U.S. Cl. .............................. 209/73; 209/74 R; 302/15; 209/111.7 T
[51] Int. Cl.[2] ........................................ B07C 5/342
[58] Field of Search ....... 209/73, 111.7 T, 111.7 R, 209/74; 235/92 PC; 302/14–16, 49; 221/264

[56] References Cited
UNITED STATES PATENTS

| | | | |
|---|---|---|---|
| 2,961,046 | 11/1960 | Moeller et al. .................. | 302/49 X |
| 3,297,157 | 1/1967 | Jensen et al. .................... | 209/111.7 |
| 3,517,807 | 6/1970 | Van Gaalen ................ | 209/111.7 X |
| 3,613,884 | 10/1971 | Van Gaalen ................ | 209/111.7 |
| 3,746,166 | 7/1973 | Van Gaalen ................ | 209/111.7 |
| 3,791,517 | 2/1974 | Friedman ................... | 209/111.7 |
| 3,827,555 | 8/1974 | Kamentsky et al. ............ | 209/111.7 |

*Primary Examiner*—Allen N. Knowles

[57] ABSTRACT

An apparatus for separating dead fish eggs from live fish eggs is designed to automatically interrogate the degree of opaqueness of each egg in a batch of fish eggs. A selector individually separates an individual fish egg from the batch and injects the separated egg into a fluid stream for delivery past an optical interrogator. Dead fish eggs which display a high degree of opaqueness are optically detected and are hydraulically separated from live eggs which show a low degree of opaqueness. The optical interrogator delivers a light from a light source conveyed through fiber optics to the fluid stream in which the eggs are injected. An electronic detector generates a first pulse for live fish eggs and a second pulse for dead fish eggs. The second type of pulse activates a hydraulic fluid switch which causes the dead fish eggs to be deposited in a separate receptacle by changing the flow direction of the fluid stream. The second pulse further activates a numerical display showing the total number of dead fish eggs sorted. Both the first and second pulses activate a numerical display showing the total number of fish eggs in the batch.

48 Claims, 16 Drawing Figures

Fig_1

Fig_3

Fig_2

Fig_4

*Fig_7*

*Fig_5*

*Fig_8*

*Fig_6*

Fig_11

Fig_12

Fig_13

Fig_9

Fig_10

METHOD AND APPARATUS FOR SORTING AND COUNTING FISH EGGS

BACKGROUND OF THE INVENTION

1. Field of the Invention

The present invention relates generally to fish egg sorters and more particularly to an automatic fish egg sorter and counter for separating dead fish eggs from a batch of fish eggs containing both live and dead fish eggs and for counting both the number of dead and total number of eggs in the batch.

2. Description of the Prior Art

The market for live fish eggs of numerous types is growing due to the increasing number of fish farms raising fish for the commercial public and conservation agencies stocking streams and lakes for the sporting public not only in the United States but throughout the world. Fish eggs are sold on a "live" basis and the number of "dead" fish eggs must be determined in a batch of eggs for calculation of the price. Dead fish eggs are easily spotted due to their high degree of opaqueness while live fish eggs are translucent.

Dead fish eggs are presently sorted from a statistical sample, selected in a batch of fish eggs, by a tedious and expensive manual process wherein each egg of the sample is individually inspected, under human visual observation, for opaqueness and then sorted, by hand, into a separate container. A manual count of the dead fish eggs, as well as the total number of fish eggs in the sample, is generally performed simultaneously with the manual sorting process.

One major disadvantage of the prior art approach is that manual sorting may damage the live fish eggs resulting in the generation of dead eggs during delivery of the finally sorted live fish eggs. Another disadvantage is that the manual process is extremely slow and is, thereby, quite expensive resulting in higher prices for live fish eggs. Still another disadvantage is the normal human error in determining the number of dead fish eggs in the fish egg batch and the normal human error in providing an erroneous fish egg count. And finally, the prior art approach relies on a statistical sample and the delivery of fish eggs containing both live and dead fish eggs.

OBJECTS OF THE INVENTION

It is an object of the present invention to provide a new device for sorting dead fish eggs from a batch containing live and dead fish eggs.

It is another object of the present invention to provide a fish egg sorter which sorts and separates dead fish eggs from live fish eggs with a minimum amount of damage thereto.

It is another object of the present invention to provide a fish egg sorter which automatically separates dead fish eggs from a batch containing live and dead fish eggs with a minimum amount of damage thereto.

It is another object of the present invention to provide an automatic fish egg sorter which individually separates each fish egg from a batch and injects the separated fish egg into a moving fluid.

It is another object of the present invention to individually interrogate the opaqueness of each fish egg in a batch of fish eggs.

It is another object of the present invention to optically interrogate each fish egg in a batch of fish eggs.

It is another object of the present invention to individually separate each fish egg from a batch of fish eggs, to inject the separated fish egg into a moving fluid, and to to optically interrogate each injected fish egg in the moving fluid, and to hydraulically separate the dead fish eggs from the live fish eggs.

It is a further object of the present invention to provide an automatic fish egg counter and sorter which individually separates the dead fish eggs from the live fish eggs, and to store the dead fish eggs in a first receptacle and the live fish eggs in a second receptacle.

It is a further object of the present invention to automatically separate dead fish eggs from live fish eggs and to provide a count of the dead fish eggs.

It is a further object of the present invention to automatically separate dead fish eggs from live fish eggs and to provide a count of the number of dead fish eggs and to provide a count of the number of both live and dead fish eggs.

It is still another object of the present invention to individually separate each fish egg from a batch of fish eggs, to inject each separated fish egg into a moving fluid, to optically interrogate the opaqueness of each injected fish egg in the moving fluid, to divert the flow direction of the moving fluid when a dead fish egg, having a high degree of opaqueness, is detected thereby causing the dead fish eggs to be individually deposited in a first receptacle and to maintain the flow direction of the moving fluid when a live fish egg, having a low degree of opaqueness, is detected thereby causing the live fish eggs to be deposited in a second receptacle, and to implement the abovesaid apparatus so that each individual fish egg is handled with a minumum of vibration, jostling, or the like.

SUMMARY OF THE INVENTION

The present invention comprises a modular automatic fish egg sorter and counter which rapidly sorts dead fish eggs from a batch containing both live and dead fish eggs and counts both the number of dead and total number of eggs in the batch. The fish egg sorter and counter comprises a storage container in which a batch of live and dead fish eggs is initially deposited. A motor-driven selector disk, disposed at the bottom of the storage container, individually separates each fish egg from the batch for injection into a downwardly moving fluid stream. The selector disk contains a plurality of holes and is driven at a constant velocity by the motor. Water delivered into the storage container flows out through a transparent tube located below the selector disk so that fish eggs disposed in the upper container move towards the outlet of the container to the tube. The selector disk is positioned so that the path of the rotating holes is disposed directly above the outlet to the tube. Fish eggs floating downwardly towards the outlet, due to the flow of water, are trapped individually in each hole of the disk and are injected into the tube at a given rate. An optical interrogator, attached to the transparent tube, provides a beam of light in the path of the injected fish eggs; so that as each fish egg breaks the beam of light, an electrical pulse is generated proportional to the optical density of the injected fish egg. Live fish eggs having a low degree of opaqueness effectuate a first pulse, while dead fish eggs having a higher degree of opaqueness effectuate a second pulse. The second pulse is amplified and converted into a binary pulse which drives a numerical display showing the number of dead fish eggs being sorted. Both the first and second pulses are amplified and converted into a binary pulse which drives a numerical display showing the total number of fish eggs in the batch. The transparent tube connects to a Y-fluid connector which under control of a hydraulic valve delivers the fluid to one of two lower receptacles. Live fish eggs pass through the tube, past the optical interrogator downwardly and through a first leg of the Y-connector into a first lower receptacle. The first lower receptacle is completely filled with fluid; therefore, any fluid flowing into that receptacle through the first leg must also flow out. An outlet hose connects the receptacle through a three-way hydraulic valve for delivery of the fluid into a drain. The live fish eggs are deposited at the bottom of the first receptacle as the fluid flows in and out. The second lower receptacle is also completely filled with fluid so that when fluid flows through the second leg of the Y-connector into the second lower receptacle, it will subsequently flow through an outlet hose therefrom and the same three-way valve into a drain. When a dead fish egg is detected by the optical interrogator, the three-way valve is actuated in response to the second pulse to transfer the fluid flow in the Y-connector from the first receptacle to the second receptacle thereby causing the dead fish egg to flow into the second leg of the Y-connector and into the second receptacle. Once the dead fish egg is past the Y-connector, the hydraulic valve is switched back to its normal operation position in which the live fish eggs are delivered through the first leg of the Y-connector into the first lower receptacle. The three-way hydraulic valve is designed so that a slow but continual flow of fluid in the second leg of the Y-connector is allowed even when the main flow is in the first leg whereby the dead fish egg is ultimately deposised in the second lower receptacle.

Other objects, advantages and capabilities of the present invention will become more apparent as the description proceeds taken in conjunction with the accompanying drawings.

DESCRIPTION OF THE DRAWINGS

FIGS. 15(a) and 15(b) show a live egg trace and a dead egg trace respectively.

DESCRIPTION OF THE PREFERRED EMBODIMENT

1. General Description

Figure 1:
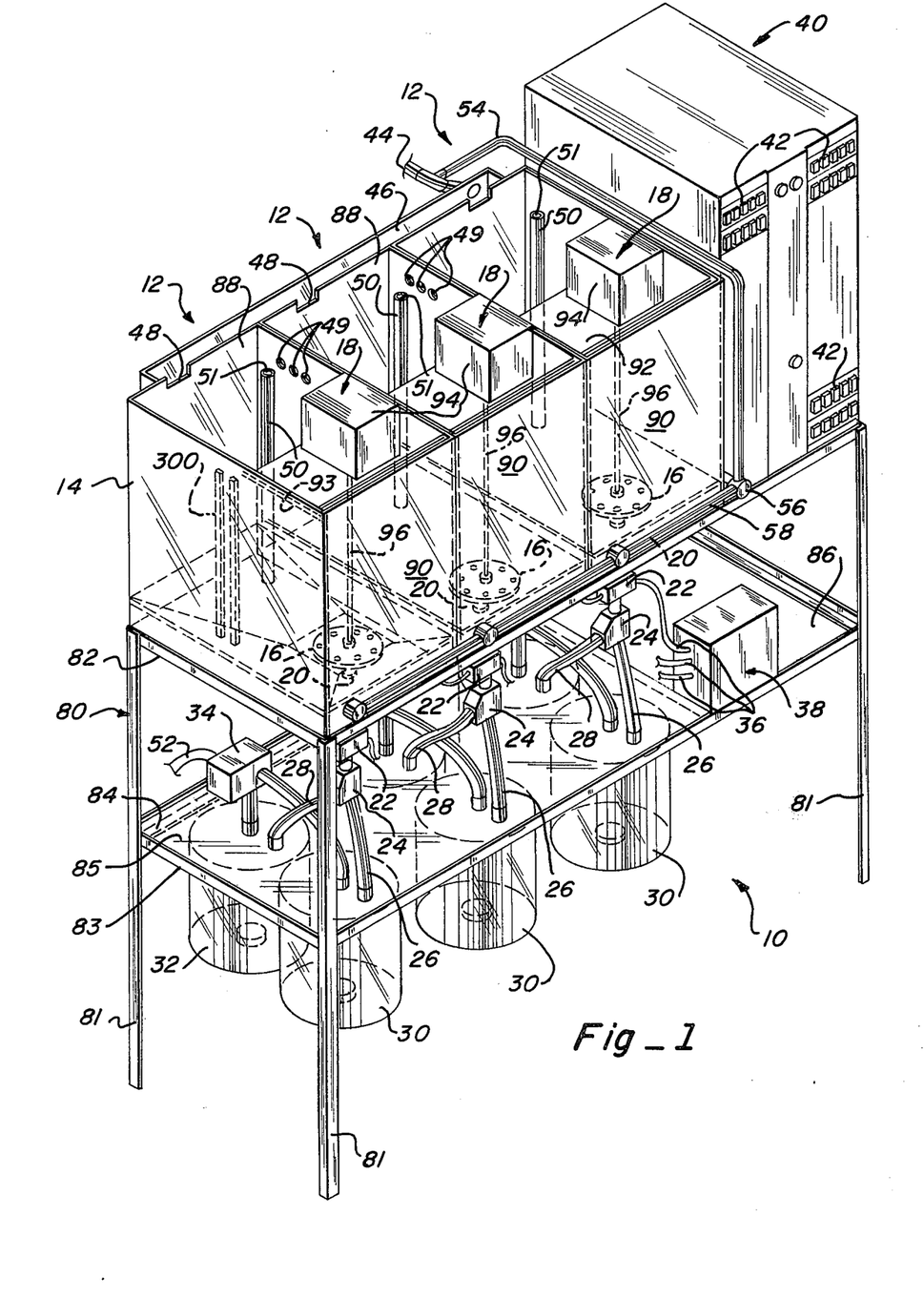
FIG. 1 is a perspective view of the fish egg sorter and counter of the present invention having three separate modular units for sorting and counting three batches of fish eggs.

Referring to FIG. 1, the fish egg sorter and counter 10 of the present invention is seen having three identical modules 12. Each module 12 includes an upper storage container 14 for storage of a batch of fish eggs containing both live and dead fish eggs, a selector disk 16 driven by a motor 18 for individually trapping each fish egg in the batch and for injecting the trapped fish egg into a moving fluid flowing through a transparent tube 20 connected at the bottom of the storage container 14, an optical interrogator 22 responsive to the flow of injected eggs passing through a light beam intersecting the transparent tube 20 for generating a first electrical pulse for each live fish egg and a second electrical pulse for each dead fish egg, a Y-connector 24 connected to the transparent tube 20 for providing two alternate paths 26 and 28, respectively, for the moving fluid containing the injected fish eggs, a first lower receptacle 30 connected in the first alternate path 26 for receiving live fish eggs, a second lower receptacle 32 connected in the second alternate path 28 for receiving dead fish eggs, and a hydraulic valve 34 connected to both lower receptacles responsive to the second electrical pulse from the optical interrogator 22 for controlling the alternate path in which the moving fluid flows.

The optical interrogator 22 receives light delivered through an optical fiber 36 from a light source 38. The first and second electrical pulses from the optical interrogator 22 are delivered to an electronics section 40 having numerical displays 42 for displaying the number of dead fish eggs, and the total number of fish eggs sorted. The electronics section 40 has three separate, but identical numerical displays 42 each operative according to the outputs of the respective optical interrogators 22 of each of the modules 12.

Fluid for operation of the present invention is delivered from an input hose 44 into a trough 46 and over a spillway 48 into the upper container 14. Each upper container 14 contains equalizer ports 49 formed therein to provide a uniform fluid level in all upper containers and an overflow valve 50 for preventing overflows. Fluid continually flows from the input hose 44 into the trough 46, into each upper container 14, downwardly through an opening into a transparent tube 20, past the optical interrogator 22, through one of the two legs, 26 or 28, of the Y-connector 24, through one of the two lower receptacles, 30 or 32, and into the hydraulic valve 34, for delivery into a drain hose 52. In this manner, fluid is continually flowing from the inlet hose 44, through the system, and into the drain hose 52. Additionally, some fluid is also delivered from the inlet hose 44 through a connecting hose 54 and into a regulating orifice 56. This regulated fluid is then delivered through connecting pipes 58 into each of the three containers 14 at a level just above the top surface of each disk 16, for a purpose to be described later, and joins the above primary fluid flow.

Figure 3:
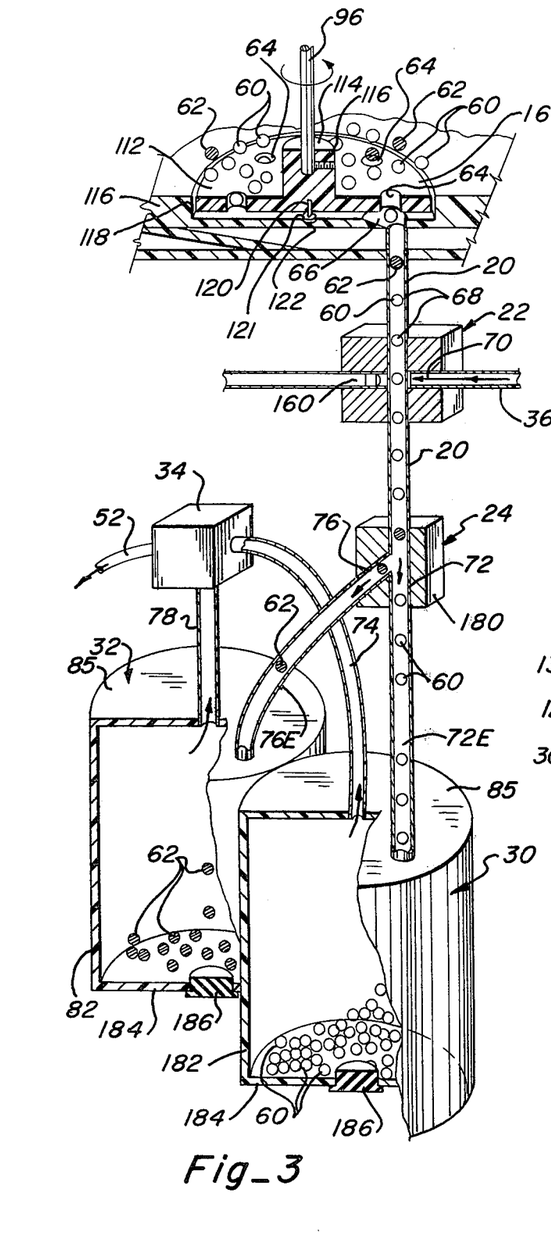
FIG. 3 is a partially cutaway perspective showing the individual injection and sorting of each fish egg from the batch of fish eggs.

Referring now to FIG. 3, it is to be seen that the present invention 10 operates in the following manner. A batch containing both live and dead fish eggs 60 and 62, respectively, is deposited into the upper container 14. The selector disk 16 comprises a circular disk portion having a plurality of holes 64 formed therein which rotates in a counterclockwise direction to individually trap fish eggs in the holes 64. As each hole 64 containing a trapped fish egg travels past an injection chute 66, the trapped egg is injected downwardly into the transparent tube 20. Each of the injected eggs 68 breaks the beam of light 70 in the optical interrogator 22 as they travel downwardly. Since a live fish egg has a lower degree of opacity than a dead fish egg, the electronic detector 160 receives light of varying intensity that is proportional to the opacity of the fish egg so that a first pulse can be generated for a live fish egg and a second pulse can be generated for a dead egg. The injected eggs 68 continually flow downwardly through the optical interrogator 22 and subsequently into the Y-connector 24. In normal operation, there are a great number of live fish eggs 60 than dead fish eggs 62. Therefore, the live fish eggs 60 normally flow through the optical interrogator 22, into the first leg 72 of the Y-connector 24 and into the first lower receptacle 30. The live fish eggs 60 are deposited in the first lower receptacle 30 while the fluid, which is continually flowing, is delivered through a return hose 74 and into the hydraulic valve 34 for delivery into the drain hose 52. However, when a dead fish egg 62 is detected by the optical interrogator 22, the hydraulic valve 34 is activated to change the flow of fluid from the first leg 72 to the second leg 76 of the Y-connector 24. The timing of the present invention is arranged such that when the dead fish egg 62 arrives at a point just above the Y-connector 24, the fluid flow changes direction and causes the dead fish egg 62 to flow down the second leg 76 and into the second lower receptacle 32 where the dead fish eggs are received. The fluid, which is continually flowing, is delivered through a return hose 78 into the hydraulic valve 34 for delivery into the drain hose 52. It is important to note, that the hydraulic valve 34, upon causing the dead fish egg 62 to be delivered into the second leg 76 of the Y-connector 24, immediately switches back (even if the next injected egg is also a dead egg) in order to permit the live fish eggs 60 to be delivered into the first lower receptacle 30. The hydraulic valve 34 of the present invention is designed to permit a minimal amount of fluid to always flow in the second leg 76 of the Y-connector 24 so that all dead eggs 62 are delivered downwardly into the second lower receptacle 32 even when the primary flow is through the first leg 72.

2. Detailed Description

Three identical modules 12 of the present invention 10, as shown in FIG. 1, are mounted in a rectangular frame 80 formed from angle iron having four legs 81 and a first and second support level, 82 and 83 respectively. Each support level has a rectangular supporting ledge 84 formed by the inwardly extending flange portion of the angle iron. The first level 82 supports the three upper storage containers 14 and the electronics display 40 while the second level 83 supports the three sets of lower receptacles, 30 and 32, attached to a rectangular platform 85 and a platform 86 upon which is mounted the light source 38.

The upper storage container 14 is of rectangular configuration designed to set on the rectangular ledge of the first level 82 of the frame 80 and is constructed of a plastic material. The plastic walls are glued or attached to from a water-tight rectangular container. In the preferred embodiment, the two side walls of adjacent containers are glued together even though it is to be understood that the upper storage container could be constructed by the inclusion of only one side wall common to adjacent containers.

A long horizontal trough 46 also constructed of plastic is glued onto the outer and upper surfaces of the three rear walls of the containers 14. Centrally situated on the upper edge of each rear wall 88 is a spillway 48 formed therein. Water delivered from an inlet hose 44 conventionally connected to the trough 46 is delivered into the trough 46 and flows through the spillway 48 into the interior of each container 14.

The side walls of each container 14 contain several equalizer ports 49 so that the water level in each container will be maintained at the same level. In addition, an upright hollow tube 50 is positioned in one corner of each container 14 so that when water reaches a predetermined level within each container, excess water is delivered downwardly through the hollow center 51 of the tube 50 into a drain, not shown. Parallel vertical ribs 300 are provided on the sides of each container 14 so that a divider, 302, can be inserted if a large batch of eggs is deposited in the container. This prevents undue pressure due to the weight of the eggs on top of the selector disk.

Atop the front wall 90 for each container 14 is a platform 92 resting on ribs 93 attached on opposite sides of the container 14. Mounted on the top of the plastic platform 92 is a water-tight container 94 containing a conventional motor 95 which is furnished electrical power from a power source, not shown. In this arrangement, should the need arise, the motor 95 mounted on the platform 92 can be lifted upwardly and removed from the container 14. The motor 95 is connected to a drive rod 96 which in turn is affixed to the selector disk 16.

Figure 2:
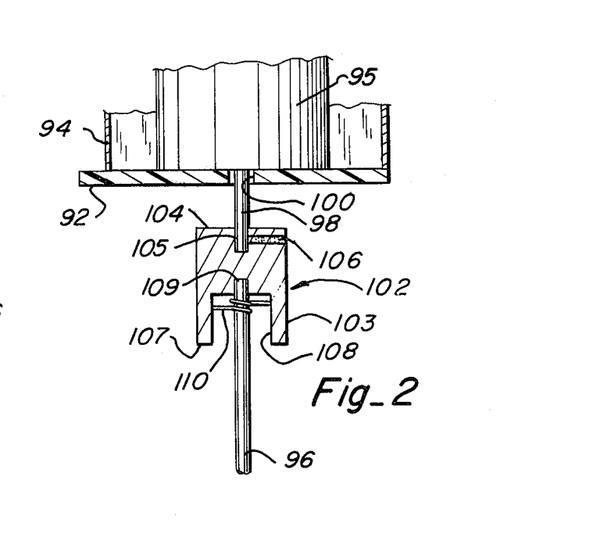
FIG. 2 is an enlarged cutaway portion of the slip clutch showing the drive shaft of the motor connecting to the drive rod of the selector disk.

In FIG. 2 the drive shaft 98 of the motor 95 is shown to be downwardly extending through a drilled hole 100 in the platform 92 and connected to a slip clutch mechanism 102. The motor 95 is conventionally mounted in the water-tight container 95 and details of such structure are not believed to be essential to an understanding of this invention.

The slip clutch mechanism 102 of FIG. 2 comprises a cylindrically shaped member 103 having a flat upper end 104 in which a hole 105 is centrally drilled and in which a set screw 106 is placed to abut a flat on the drive shaft 98 of the motor 95. The bottom end 107 of the cylindrical member 103 contains a counterbore 108 centrally disposed with a hole 109 drilled therein. The drive rod 96 slideably engages the drilled hole. Around the drive rod 96 is attached a circular wire spring 110 having both ends thereof extending outwardly and forcefully against the inner surface of the counterbore 108 so that as the drive shaft 100 rotates, the cylindrical member 103 also rotates, causing the rod to rotate due to the frictional engagement of the two opposing ends of the wire spring 110. Should the shaft 100, however, bind or otherwise become resistant to movement, the cylindrical member 103 overcomes the frictional resistance of the wire spring 110 and rotates without transferring rotation to the rod 96. Such an arrangement is desirable to prevent damage to the fish eggs. It is important to note that the amount of force necessary to bind the rod 96 may be varied by the tensioning of the wire spring 110.

The selector disk 16, as shown in FIGS. 1 and 3, comprises a main circular disk portion 112 having an integral upwardly extending collar 114 into which the drive rod 96 is inserted and operatively connected by a set screw 115. In the main circular disk portion 112, seven equally spaced holes 64 are provided near the outer periphery of the disk 16.

The bottom wall 116 of the container also has a circular cavity 118 cut therein substantially conforming to but slightly greater in diameter than the selector disk 16 and of sufficient depth so that the upper surface of the selector disk 16 lies in the same horizontal plane as the upper surface of the bottom wall 116. The selector disk 16 is pivoted in one end of a pin 120 protruding from the center of the opposite side of the collar 114. The pointed end of the pin 120 seats on a washer 121 disposed above a shallow recess 122 centered in the circular cavity 118. The depth of the circular cavity 118 is such that the bottom surface of the disk 16 is slightly spaced in parallel relationship with the upper surface of the cavity so that while fluid can flow underneath the disk, fish eggs cannot be caught thereunder.

To briefly summarize, the motor 95 mounted on the platform 92 continuously drives a slip clutch mechanism 102 which in turn drives, but not above a given torque, the rod 96 connected to the selector disk 16 which is pivotally in the cavity 118 formed in the bottom wall 116 of the upper container 14. Before discussing how the selector disk 16 individually traps fish eggs, it is necessary to present the details of the structure of the upper container 14 in which the selector disk 16 is disposed.

Figure 4:
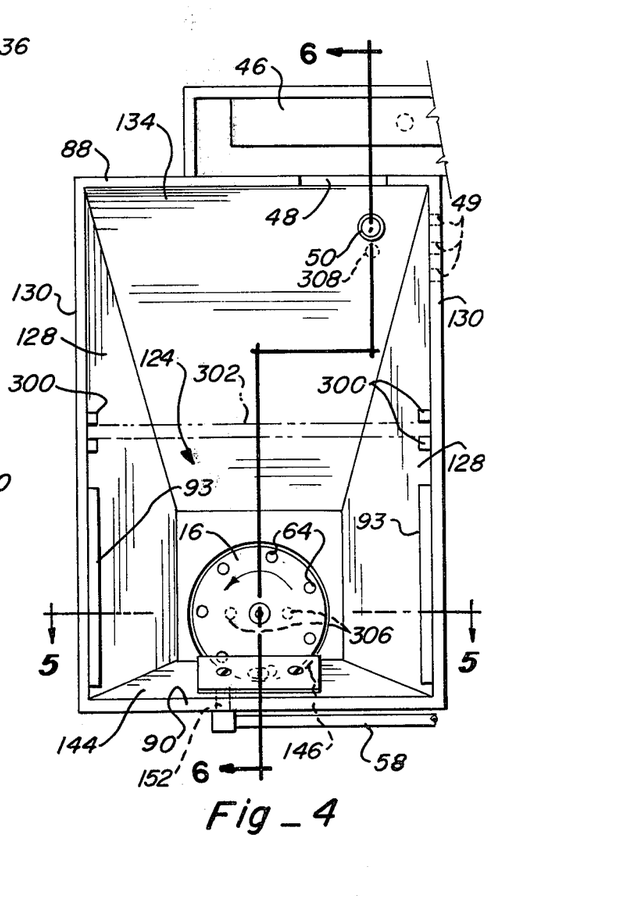
FIG. 4 is a top view of an upper storage container showing the interior hopper configuration.

The upper container 14, as best shown in FIGS. 1 and 4 contains, near the bottom wall 116 of the container, a hopper formed by downwardly and inwardly sloping partitions which converge to define a substantially square bottom wall. In this manner, when a batch of live and dead fish eggs is placed in the upper container 14, the fish eggs will naturally, by the force of gravity, and by the flow of the water in a manner to be subsequently described, congregate in the area just above the selector disk 16 as shown in FIG. 3.

Figure 5:
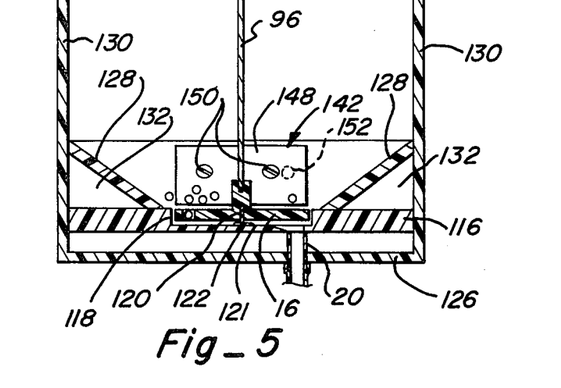
FIG. 5 is a partial sectional view taken through the center of the selector disk of FIG. 4.
Figure 6:
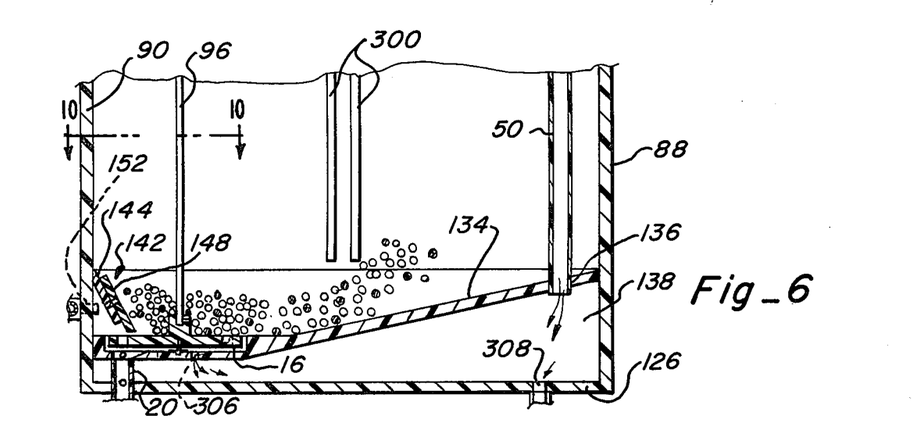
FIG. 6 is a partial offset sectional view taken through the center of the selector disk and drain tube of FIG. 4 to show the end and bottom wall construction of the upper storage container.

FIGS. 5 and 6 disclose the details of these sloping partitions. In FIG. 5, the bottom wall 116 is disposed in parallel spaced relation above a sub-wall 126. The bottom wall 116 is of greater thickness than any other wall in the upper container 14 in order to accommodate the cavity 118 containing the selector disk. The sloping side partitions 128 are formed from plastic, in the preferred embodiment, by tapering the edges of the plastic to mate with the vertical side walls 130 and with the bottom wall 116 in water-tight engagement. The sloping side partitions 128 are firmly and permanently glued in place. Triangular shaped chambers 132 are formed between the side vertical walls 132, the sloping partitions 128, and the bottom wall 116. In the present embodiment, these chambers contain atmospheric air and are devoid of water due to the water-tight permanent gluing of the sloping surfaces of the side and bottom walls.

FIG. 6 illustrates the construction of the rear sloping partition 134 to be an integral part of the bottom wall 116. The bottom wall 116, as mentioned, is of greater thickness than any of the other walls in the upper container 14, however, at a point commencing at one end of the selector disk 16 and extending upwardly towards the rear wall 88, the bottom wall 116 narrows to the normal thickness of the other walls. It is apparent upon inspection of FIG. 4 that this upwardly extending partition 134 also flares outwardly to the vertical edges of the rear wall 88.

The overflow tube 50 is mounted through a hole 136 drilled in the rear sloping partition 134, and as shown in FIG. 6, passes through the rear sloping partition so as to open into the space 138 between the partition 134 and the sub-wall 126. The overflow tube 50, of course, engages the rear sloping partition 134 in a water-tight seal.

To briefly summarize, the bottom portion of the upper container 14 contains downwardly and inwardly sloping partitions forming a hopper to direct fish eggs placed therein towards the upper surface of the selector disk 16. Referring back to FIG. 3, the operation of the selector disk 14 in trapping eggs will now be described.

Figure 7:
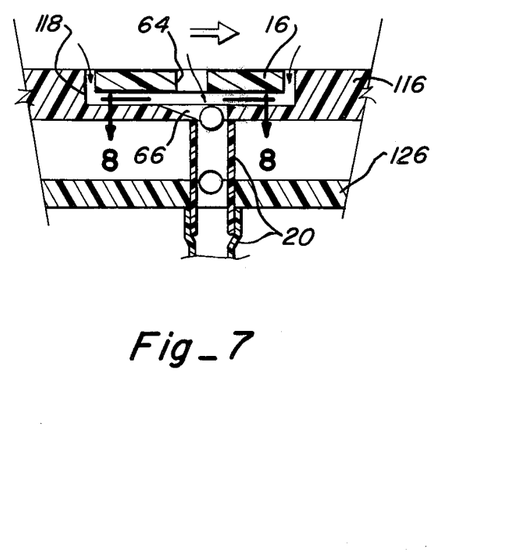
FIG. 7 is an enlarged fragmentary sectional view of the selector disk illustrating the injection of a trapped fish egg into a moving fluid.

Water flows from the interior of the upper container 14 downwardly into a transparent tube 20 through the Y-connector 24, into the two lower receptacles, 30 and 32, and out from the lower receptacles into the hydraulic valve 34 and subsequently to the drainage hose 52. Water also flows from the interior of container 14 through the holes 64 of the selector disk 16 and through holes 306 into space 138 for delivery into the drain port 308 formed in sub-wall 126. This secondary water flow creates a suction in each of the seven holes 64 drilled in the selector disk 16. A fish egg in the vicinity of a hole 64 will be sucked into the hole and, thereby, trapped by the continuous pressure of the flowing water through the hole. Once a hole 64 traps a fish egg, no further eggs can be trapped in the hole 64. When all seven holes 64 contain trapped fish eggs, the flow of the water would cause damage to the eggs unless alternate flow routes for the water are provided. The alternate routes, as shown in FIG. 7, occur along the outer circumferential edge of the selector disk 16.

Figure 8:
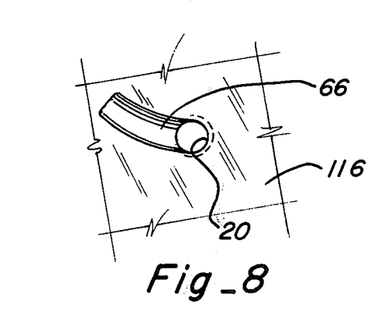
FIG. 8 is a top fragmentary view of the delivery chute of FIG. 7.

FIG. 3 illustrates a plurality of fish eggs including dead fish eggs 62 congregating, as previously discussed, above the selector disk 16. As the selector disk 16 rotates at a constant velocity in the counterclockwise direction, fish eggs become trapped in the holes 64 by the secondary water flow in a manner previously discussed. Each of these trapped fish eggs is subsequently delivered over an injection chute 66, as illustrated in FIGS. 7 and 8. The shape of the injection chute 66 is one of an elongated arcuate surface converging downwardly along a path corresponding to the rotation of the holes 64 into the circular inlet of the transparent tube 20. FIG. 7 illustrates a trapped egg descending from a hole 64 downwardly in the injection chute 66 and into the transparent tube 20. The transparent tube 20 engages the bottom wall 116 and the sub-wall 126 in a fluid-tight connection.

To briefly summarize, holes 64 in the selector disk 16 trap individual fish eggs as the water flows from the upper container 14 downwardly into the lower receptacles, 30 and 32. As the selector disk 16 rotates over the injection chute 66 the trapped fish eggs are dropped into the transparent tube 20 at a constant periodic rate depending on the rotation speed of the disk 16. The rate at which fish eggs are injected, in the present embodiment, can be varied between 400 to 500 eggs per minute. For fish eggs having diameters of 3/16 to ¼ inch, in the preferred embodiment, a 3 inches diameter, ¼ inch thick selector disk, with trapping holes of ¼ inch diameter is used. The inner diameter of the transparent tube for such fish eggs is preferably 5/16 inch.

The spacing of the selector disk 16 above the upper surface of the cavity 118 in the bottom wall is designed such that as the fragile fish eggs are trapped and rotated over the injection chute 66, the trapped fish eggs cannot become wedged between the undersurface of the selector disk 16 and the upper surface of the cavity 118. In addition, the injection chute 66 is designed to gently release the trapped fish egg in a downwardly descending pattern so that the fish egg has dropped into the transparent tube 20 before the hole 64 in which it was trapped passes over the transparent tube 20. If an injection chute 64 is not provided, it is evident, that as the fish egg drops into the discharge tube, possible shearing of the fish egg may occur by the rear side of the hole 64.

Figure 9:
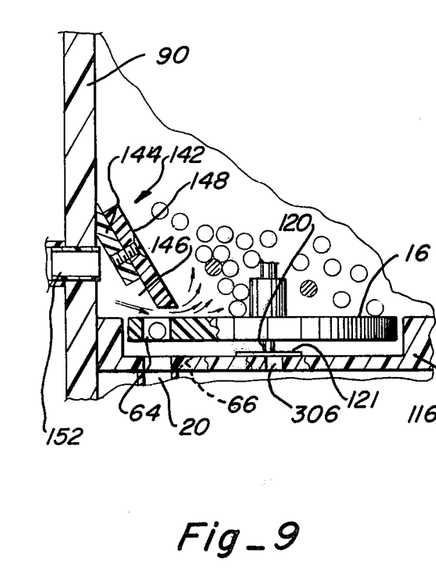
FIG. 9 is an enlarged fragmentary view of the buffer plate and selector disk of FIG. 6 illustrating the fluid buffering action.
Figure 10:
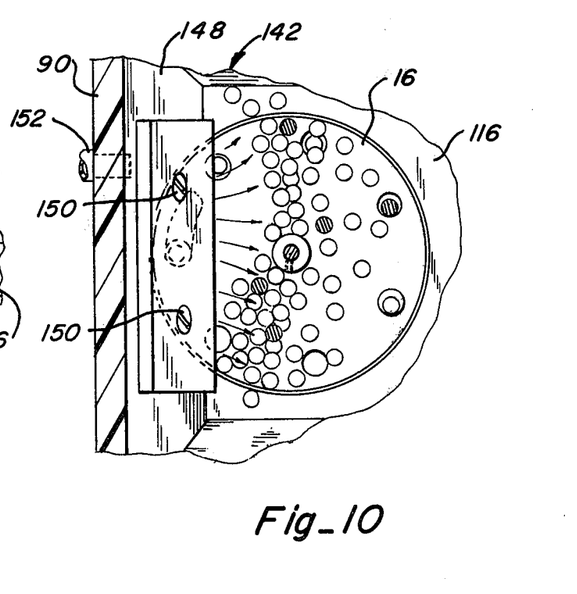
FIG. 10 is a top view of the buffer plate and selector disk.

Due to the rotation of the selector disk 16, the water in the immediate vicinity above the selector disk 16 is in a counterclockwise turbulent pattern. Fish eggs congregating above the upper surface of the selector disk 16 can be caught in the turbulence and thrust against the front wall 90 of the upper container 14. This problem is eliminated in the present invention by the provision of a buffer mechanism 142 as best shown in FIGS. 4, 5, and 6. An inwardly sloping front partition 144 is provided, in a manner as those previously discussed, except that a cutout 146 is provided to allow an arcurate portion of the selector disk 16 to be disposed directly under the sloping partition 144. This front sloping partition 144 is glued to the bottom wall 116, to the two side sloping partitions 128, and along its entire upper surface to the front wall 90. Positioned over the front sloping partition 144 is a buffer plate 148 of longitudinal rectangular design, which is oriented above the selector disk 16 at a point inward from a circle defined by the rotating holes. Flat head screws 150 hold this buffer plate firmly against the forward sloping partition 144. Immediately behind the front sloping partition 144 and oriented in a position where the turubulence of the water created by the rotating selector disk 16 would be the greatest, is a conventional input port 152 where water regulated by the orifice 56, as previously discussed, flows into the container 14. Referring now to FIG. 9, it is evident that the regulated water flowing in behind the front sloping partition 144 flows out under the buffer plate 148 and, if of sufficient pressure, will counteract the turbulence created by the rotating selector disk 16 thereby buffering eggs from being thrust against the front wall 90. Obviously, by regulating the size of the orifice 56, a greater or lesser amount of water can be delivered over the selector disk 16 to counteract the turbulence.

To briefly summarize, a technique has been provided in the present embodiment whereby the turbulence created by the rotating selector disk 16 which could cause damage to live fish eggs has been counteracted by providing a suuply of buffering water over the upper surface of the disk at a point of greatest turbulence and also to provide a slanting buffering plate 148 to minimize any destructive contact the fish eggs may have with the front wall 140.

Figure 11:
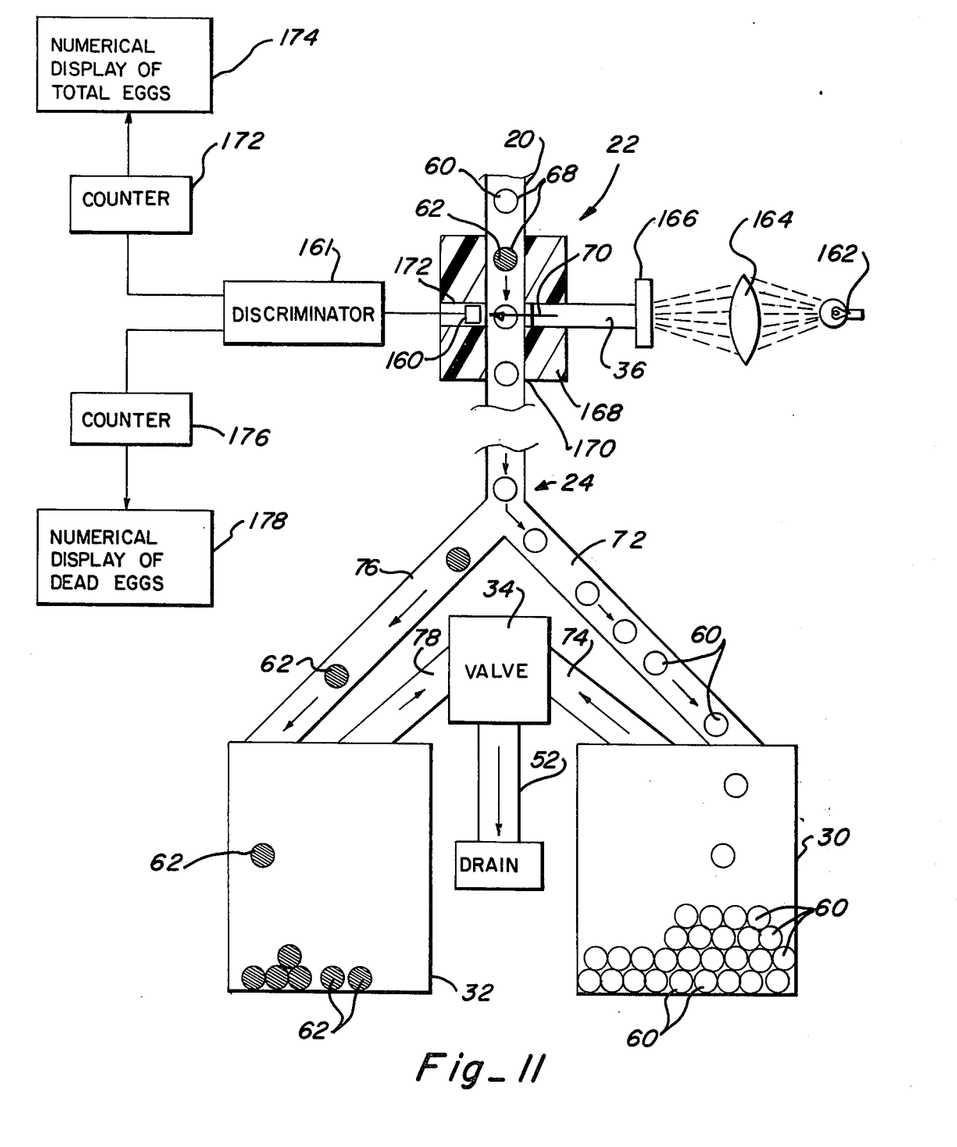
FIG. 11 is a schematic representation of the present invention detailing the optical interrogation and the hydraulic separation of dead fish eggs from live fish eggs.

In FIG. 11, the operation of the system after the trapped fish eggs are injected into the fluid stream contained by the transparent tube 20 is schematically shown. The trapped eggs are injected at periodic intervals dependent upon the speed of the rotating selector disk 16 and the rate at which the water flows through the system. The disk 16 rotates, in the present embodiment, at speeds, for example, of 40 to 70 RPM. In the present embodiment the rate of water flow in the tube 20 is designed to be 1 inch of travel in 160 msec.

Each injected fish egg in the transparent tube 20 is centered in the fluid stream since the water moving in the center of the tube 20 moves at a greater velocity than the water near the sides of the tube 20 due to the frictional engagement of the surface of the tube 20 with the water thereby centering such injected fish egg in the stream.

The injected fish eggs are delivered through the optical interrogator 22 which conveys a beam of light 70 through the transparent tube 20 and into the electronic detector or photocell 160. As each injected fish egg 68 breaks the beam of light 70, the intensity of the light impinging on the detector 160 varies. A dead fish egg 62 has a high degree of opaqueness, while a live egg 60 has a low degree of opaqueness. Therefore, a dead fish egg 62 will block a substantial portion of the light beam while a live fish egg 60 will allow a greater amount of the light beam 70 to impinge. Clearly, the intensity of light on the detector 160 is much greater when no fish egg is present.

The light beam 70 is generated from a conventional regulated direct voltage, high intensity light bulb 162 whose light is focused by a convex lens 164 onto a glass plate 166. Attached to the opposite side of the glass place 166 by epoxy is one end of a conventional optical fiber 36. The light is conveyed, in a well known manner, through the optical fiber 36 to the outer surface of the transparent tube 20.

Enveloping the tube 20, as illustrated in FIG. 3, is a rectangular holder 168 coated with black paint on all surfaces to absorb light. The rectangular holder 168 has a drilled vertical hole 170 conforming to the outer diameter of the transparent tube 20 so that the rectangular holder 168 is press fitted over the tube 20. A horizontal aperture 172 is drilled through the rectangular holder 168 into which the optical fiber 36 is inserted and glued therein to abut the outer surface of the tube 20. Opposite the optical fiber 36, an electronic detector 160 is permanently mounted and glued in the horizontal aperture 172. It is important that all ambient light be prevented from entering the electronic detector 160. Therefore, the vertical height of the rectangular block 168 is sufficient to block the entry of any light traveling down the tube 20. In addition, the vertical hole 170 is also coated with black paint to prevent any reflective light from entering the detector 160. The connections of the optical fiber 36 and of the electronic detector 160 into the horizontal aperture 172 are also sealed and coated black to prevent any light leakage from these connections. Finally, the optics section is mounted within a box 38, as shown in FIG. 1.

Referring to FIG. 11, a discriminator circuit 161 processes the two classes of pulses (i.e. a first pulse corresponding to live fish eggs and a second pulse corresponding to dead fish eggs) from the electronic detector 160 and generates two types of square wave binary signals. The first signal is generated whenever a fish egg, whether live or dead, breaks the beam of light 70 and the second signal is generated whenever a dead fish egg 62 breaks the beam of light 70. The first binary signal drives a conventional binary counter 172 which in turn drives a conventional numerical display 174. The second binary signal drives a second conventional binary counter 176 which in turn drives a second conventional numerical display 178 to provide a visual total of the number of dead fish eggs. The elecronics in the discriminator 161 will be subsequently discussed in detail, the counters and numerical displays are conventional and any of a number of different conventionally available circuits could be utilized.

After the injected fish eggs 68 pass the optical interrogator 22, the live fish eggs 60 enter a first leg 72 of the Y-connector 24 and are delivered into a first receptacle 30, while the dead fish eggs 62 are separated from the live eggs 60 and are delivered into the second leg 76 of the Y-connector 24 for deposition into the second lower receptacle 32.

Normally, there are more live fish eggs 60 than dead fish eggs 62 so that the normal flow of the water would be down the first leg 72. This is accomplished by having the hydraulic valve 34 shown in FIG. 3 direct the flow of water in the transparent tube 20 down the first leg 72 into the first receptacle 30, out of the first receptacle 30, through the valve 34, and into the drain 52. However, when a dead fish egg 62 is sensed by the optical interrogator 22, the hydraulic valve 34 is activated to cause the flow of the water to switch from the first leg 72 into the second leg 76 thereby diverting the dead fish egg 64 down the second leg 76 and into the second lower receptacle 32. The hydraulic valve 34 then switches the water flow back to its normal flow and causes the live fish eggs 60 to be continually deposited in the first lower receptacle 30.

It is important to note that if the valve 34 is truly "on" and "off," that once the dead fish egg 62 is separated and transferred to the second leg 76, all water flow would stop in second leg 76, and it is possible, according to the Bernoulli Principle, that the dead fish egg 62 may be sucked back into the first leg 72.

To avoid this problem, the hydraulic valve 34 is designed, as will be subsequently discussed, to permit a minimum amount of water to be continually flowing in the second leg 76 so that after diverting the dead fish egg 62 from the normal flow, the dead fish egg 62 will continue downwardly through the second leg 76 and into the second lower receptacle 32 at a relatively slow rate.

The Y-connector 24, in the present embodiment, is mounted in a rectangular holder 180, as shown in FIG. 3. The transparent tube 20 is connected in a conventional fashion to the Y-connector 24. The first leg 76 of the Y-connector 24 is connected to a first leg extension tube 72E, which is also a flexible plastic tube connected to the Y-connector 24 in a conventional fashion, and is further connected to the first lower receptacle 30 in a conventional fashion. Likewise, the second leg 76 of the Y-connector 24 is connected to a second leg extension 76E tube which in turn is conventionally connected to the second lower receptacle 32.

The lower two receptacles, 30 and 32, are of cylindrical design each having vertical side walls 182 and planar bottom walls 184. The top of each receptacle is affixed by glue or other means to the rectangular platform 85. Each receptacle is filled with water to eliminate all air spaces and, when the system is sorting and counting fish eggs, water flows into each receptacle, 30 and 32, through its respective leg extension tube, 72E and 76E, and upwardly and outwardly through return tubes, 74 and 78, connected to the hydraulic valve 34. These return tubes, 74 and 78, are disposed at the center of each receptacle, 30 and 32, and connected thereto in a conventional fashion. The extension and return tubes, in the present embodiment, are formed from rigid plastic, and interconnect with a conventional three-way hydraulic valve 34 modified in a manner hereinafter discussed. The hydraulic valve 34 is electrically operated so that water may flow into the drain hose 52 either from the return tube 74 from the first receptacle or from the return tube 78 from the second receptacle. This creates the flow reversal necessary for separating dead eggs 62 as previously discussed.

At the bottom of each lower receptacle, 30 and 32, is a wide-mouthed plug 186, firmly inserted into a correspondingly shaped hole formed in the bottom of the receptacle. These plugs 186 are made from rubber and enable the removal of the live and dead fish eggs from their respective receptacles.

Figure 12:
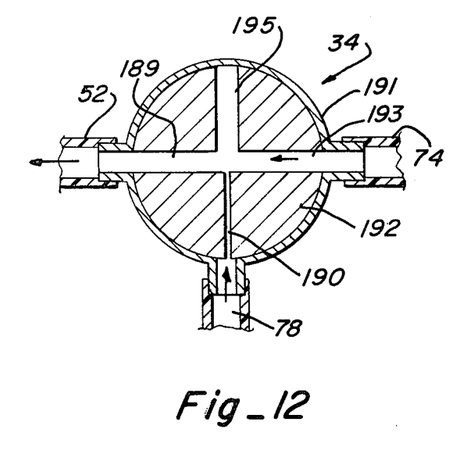
FIG. 12 is a cross-section of the three-way hydraulic valve of the present invention showing fluid flow from the first lower receptacle into the drain.
Figure 13:
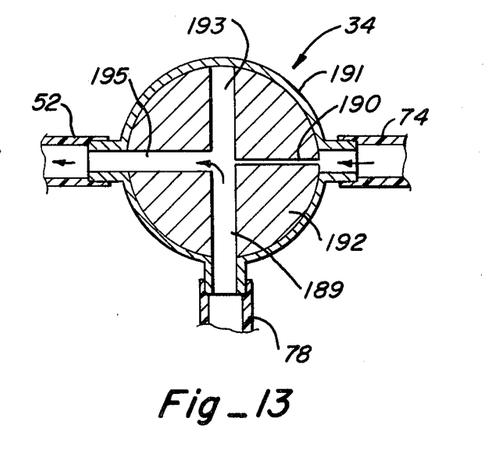
FIG. 13 is a cross-section of the three-way hydraulic valve of the present invention showing fluid flow from the second lower receptacle into the drain.

The operation of the hydraulic valve 34 will now be discussed. In FIG. 12 the hydraulic valve 34 is shown delivering most of the water from the first lower receptacle return hose 74 into the drain hose 52 through ducts 189 and 193. However, a small pathway 190 has been drilled through the valve portion 192 connecting duct 189 to the return hose 78 coming from the second lower receptacle 32. As mentioned previously, this permits the dead fish eggs 64 to be delivered down the second leg extension tube 76E after that egg has been diverted from the flow of the live fish eggs as shown in FIG. 11. When the dead fish egg is being diverted from the live fish eggs, as shown in FIG. 13, the valve portion 192 rotates under solenoid action, and ducts 189 and 195 deliver the water flowing from return hose 78 into the drain hose 52. The small pathway 190 now delivers a minute amount of water from the return hose 74 of the live fish egg water flow into duct 195 causing the live fish eggs in the first leg extension tube 72E to travel toward the first receptacle 30.

The hydraulic valve 34 may be a conventional three-way valve, modified as discussed above, which operates to switch the water flow in three milliseconds upon activation of its solenoid, now shown. The present embodiment uses a RED-HAT valve, No. 8320A 11 manufactured by Automatic Switch Co. of Florham Park, New Jersey.

Figures 14, 15:
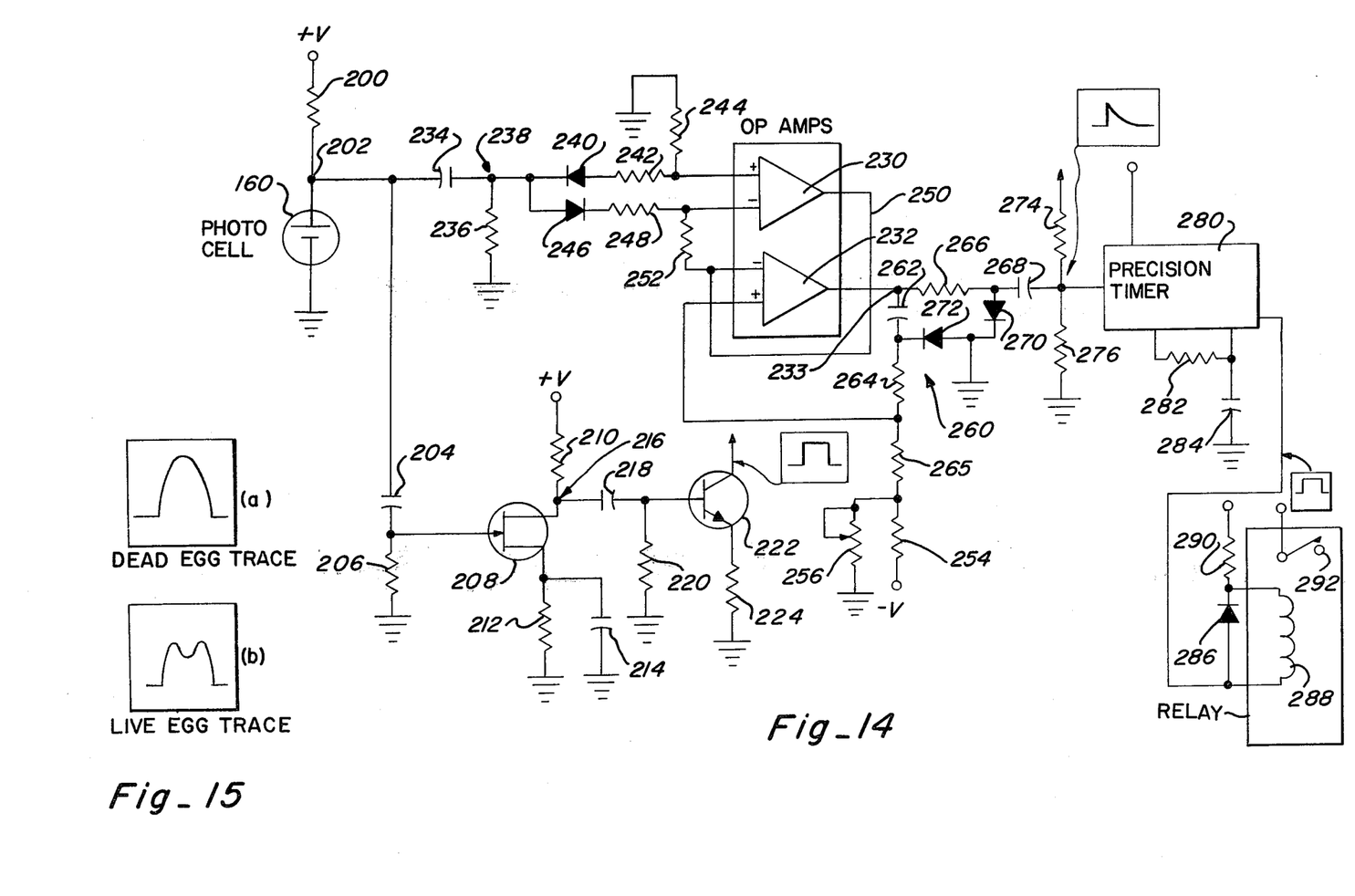
FIG. 14 is a schematic of the electronic detector circuit utilized in the discriminator of FIG. 11.

In FIG. 14 the electronic circuitry for detecting, discriminating and amplifying the pulses differentiating the live fish eggs 60 from the dead fish eggs 64 is shown. A grounded photocell 160 is biased through a resistor 200 to positive voltage (+V). The present embodiment uses a CLAREX CL 905 HL photocell. The voltage pulses formed at node 202 is represented in FIG. 15 for the two varieties of eggs. The live fish egg pulse, contains the highest voltage reading at the points of greatest opaqueness which are the sides of the fish egg. The center of the live fish egg has a greater transparency than the sides of the live fish egg and, therefore, the voltage is lower at the center of the pulse. The voltage trace of the dead fish egg, however, would have its maximum opaqueness at the center of the egg as represented in the dead fish egg pulse of FIG. 15.

It is desired to generate a signal from the two types of pulses in FIG. 15 independent of whether the fish egg is a live fish egg or a dead fish egg and to deliver that signal to the counter 172 as shown in FIG. 11. This is accomplished in the following manner. Either voltage pulse appearing at the node 202 is delivered through a capacitor 204 and a resistor 206 to ground. The voltage appearing at the resistor 206 is delivered to the base of high impedance J-FET 208 to drive the J-FET 208 into saturation. Current is now delivered from a voltage source (+V) through a resistor 210, through the saturated J-FET 208 and through a resistor 212 and capacitor 214 parallel combination to ground. The voltage at node 216 is delivered through a capacitor 218 and resistor 220 to ground, the voltage across the resistor 220 is delivered to the base of a transistor 222. This drives the transistor 222 to saturation, as shown by the voltage trace at the output of the emitter of transistor 222. In a conventional manner, this output signal drives the counter 172 shown in FIG. 11 for display on the numerical display 174 representing the total number of eggs generated.

It is further desired to generate a second signal from the two types of pulses in FIG. 15 only when the pulse corresponding to a dead fish egg appears at node 202. The operational amplifiers circuit, 230 and 232, provides discrimination between the two pulses at node 202 (i.e. from the live fish eggs and from the dead fish eggs) so that a signal is only generated to the dead fish egg counter 176 when a dead fish egg pulse appears. This is accomplished by using the two operational amplifiers (hereinafter OP AMP) as a double peak discriminator in the following manner.

The signal appearing at node 202 is delivered through a capacitor 234 and a resistor 236 to ground, the voltage at node 238 appearing across the resistor 236, if negative, is delivered through a diode 240 and a resistor 242 shunted to ground through resistor 244 to the non-inverting input (+) of the first OP AMP 230, and, if positive, is delivered through a diode 246 and a resistor 248 to the inverting input (−). The output on lead 250 of the first OP AMP 230 is essentially an amplification of the positive peaks and a shunting of the negative peaks appearing in the voltage pulses of the live and dead fish egg traces, as shown in FIG. 15, and is delivered over lead 250 to the inverting input (−) of the second OP AMP 232.

The first OP AMP 230, therefore, increases the positive peak voltage in the trace of the dead fish egg, while passing the positive peaks in the trace of the live fish egg through relatively unchanged, but with the negative peak substantially shunted.

Combined with the signal from the output 250 of the first OP AMP 230 is the signal input of the inverting input (−) of the first OP AMP 230 delivered through a resistor 252. The second OP AMP 232 turns on when a peak voltage level above a predetermined value appears on its inverting input (−). The predetermined value is determined by the value of voltage found at the non-inverting input (+) of OP AMP 232. The non-inverting input is biased through a resistor 265 to a resistor 254 and to a negative voltage source (−V) which is in parallel with or grounded trim potentiometer 256. Adjustment of the trim potentiometer 256 varies the predetermined voltage at which the second OP AMP 232 will turn on.

A pull-up circuit 260 is further provided to speed up the turning on of the second OP AMP 232. As the second OP AMP 232 turns on, the output at node 233 commences to go negative which is delivered through a capacitor 262 and a resistor 264 to the non-inverting input (+) of OP AMP 232. This causes the predetermined value to drop thereby lowering the turn on level for the second OP AMP 232. In this manner, the second OP AMP 232 rapidly turns on in response to detecting the higher peak level of the dead fish egg trace. After the higher peak is detected, the pull-up circuit 260 is quickly discharged by paths established to ground through the diodes 270 and 272.

The output at node 233 is delivered through capacitor 268 and resistor 274 to the input of the dead egg counter 176 as shown in FIG. 11 and appears as a sawtooth wave. It is also delivered to the input of a precision timer 280. The precision timer 280 is conventional in the art and generates a 100 ms pulse (as determined by the RC time constant of resistor 282 and capacitor 284) as shown in FIG. 14 for activating the solenoid of the hydraulic valve 34. The 100 ms pulse is delivered through the coil of a realy 292 which has a protective diode 286. Power for operating the relay is furnished to the coil 288 through a resistor 290 connected to a voltage supply. It is apparent that any similar type precision timer 280 may be utilized which generates a pulse sufficient to drive the relay 292. When the relay 292 closes power is furnished to the solenoid of the hydraulic valve 34 which then operates.

Accordingly, a method and apparatus for automatically sorting and counting dead fish eggs from a batch of fish eggs has been disclosed. It will be appreciated that the method and apparatus disclosed materially reduces time and labor expenses currently existing in the fishing industry in the manual sorting and counting of a statistical sample of fish eggs.

Although the present invention has been described with a certain degree of particularity, it is understood that the present disclosure has been made by way of example and that changes in details of structure and procedure may be made without departing from the spirit thereof.

I claim:

1. An apparatus for sorting dead fish eggs from a container storing a batch of both live and dead fish eggs, said apparatus comprising:
    means connected to said container for individually separating and injecting fish eggs at a predetermined frequency from said batch into a moving fluid, and
    means responsive to a dead fish egg in said moving fluid for diverting the flow of the portion of said moving fluid containing said dead fish egg out of a main flow of said fluid.

2. The apparatus of claim 1 in which said batch of fish eggs is in a turbulent condition.

3. The apparatus of claim 2 in which said diverting means further comprises:
    means responsive to the presence of said injected eggs in said moving fluid for detecting said dead egg, and
    means responsive to said detection for changing the flow direction of said portion of said moving fluid containing said dead egg.

4. The apparatus of claim 3 in which said detecting means comprises:
a light source,
means connected to said light source for conveying light from said light source through said moving fluid, and
means receptive of said conveyed light for generating a first electrical pulse for a live fish egg and a second electrical pulse for a dead fish egg when said live and dead fish eggs pass through said conveyed light.

5. The apparatus of claim 4 in which said detection means conprises a hydraulic valve responsive to said second electrical pulse for changing the flow direction of said portion of said moving fluid containing said dead egg.

6. The apparatus of claim 3 in which said changing means comprises:
a first receptacle for storing live fish eggs,
a second receptacle for storing dead fish eggs,
a Y-fluid connector having a first and second branch for connecting said moving fluid to said first receptacle over said first branch and to said second receptacle over said second branch,
a drain, and
a valve having a first input connected to said first receptacle and a second input connected to said second receptacle for controlling the direction of flow of said moving fluid, said valve being responsive to said detection for switching the direction of flow from said first receptacle to said second receptacle for the portion of said moving fluid containing said dead fish egg.

7. The apparatus of claim 6 in which said valve before said switching occurs passes an amount of said moving fluid through said second input, said aforesaid amount being substantially less than the total amount of said moving fluid; and in which said valve after said switching occurs passes an amount of said moving fluid through said first input, said aforesaid amount being substantially less than said total amount of said moving fluid.

8. The apparatus of claim 1 further comprising:
means responsive to said injected fish eggs in said moving fluid for determining the total number of said fish eggs in said batch.

9. The apparatus of claim 8 in which said determining means further comprises:
means responsive to said injected fish eggs in said moving fluid for generating a first pulse for each live fish egg and a second pulse for each dead fish egg.

10. The apparatus of claim 9 in which said generating means comprises:
a light source,
means connected to said light source for conveying light from said light source through said moving fluid, and
means receptive of said conveyed light after passage through said fluid for generating said first pulse for a live fish egg and said second pulse for a dead fish egg when said injected fish eggs pass through said conveyed light.

11. The apparatus of claim 10 in which said conveying means is optical fiber.

12. The apparatus of claim 10 further comprising:

first means operative upon the appearance of said second pulse for activating said diverting means, and
an electrical display for showing the number of dead fish eggs, and
second means operative upon the appearance of said second pulse for driving said display.

13. The apparatus of claim 12 further comprising:
a second electrical display for showing the total number of fish eggs in said batch; and
means operative upon the appearance of either said first or second pulse for driving said second display.

14. An apparatus for sorting dead fish eggs from a container storing a batch of both live and dead fish eggs, said apparatus comprising:
means in said container for individually separating fish eggs while preserving viability of said live fish eggs from said batch,
means operative with said separating means for placing said separated fish eggs into a moving fluid, and
means responsive to a dead fish egg in said moving fluid for diverting the flow of the portion of said moving fluid containing said dead fish egg out of the flow of said fluid.

15. The apparatus of claim 14 in which said separating means further comprises a rotating disk disposed in the bottom of said container for collecting a plurality of fish eggs, said disk having a plurality of holes formed therein and each hole being shaped in substantially the diameter of the fish eggs for trapping an individual fish egg.

16. The apparatus of claim 15 in which said separating means further comprises:
a motor having a drive shaft, said motor being positioned on top of said container, and
means interconnecting said drive shaft with said disk for transferring rotation from said drive shaft to said disk.

17. The apparatus of claim 16 in which said transferring means comprises:
a slip clutch engaging said drive shaft, and
a rod connected to said slip clutch for interconnecting said clutch with said disk.

18. The apparatus of claim 17 in which said clutch comprises:
a coupler attached to said drive shaft for rotating with said drive shaft, said coupler slideably engaging said rod, and
a spring attached to said rod for frictionally engaging said coupler so that the rotation of said coupler is transferred to said rod.

19. The apparatus of claim 15 in which said placing means comprises:
a tube connected to the bottom wall of said container for conveying said moving fluid, and
an injection chute in said bottom wall having a shallow downward ramp merging into said tube, said injection chute extending downwardly in the direction of said disk rotation.

20. The apparatus of claim 15 further comprising means for buffering the fish eggs in said batch from being thrust against the side wall of said container by the turbulence created by said rotating disk.

21. The apparatus of claim 20 in which said buffering means further comprises:
a rectangular buffering plate affixed at the upper end to said side wall and downwardly extending to a point just above said rotating disk, and means between said side wall and said buffering plate for introducing fluid, at a point where said turbulence is the greatest, through the longitudinal narrow space formed between the upper surface of said rotating disk and the lower end of said buffering plate thereby preventing fish eggs in said batch from being thrust against said side wall.

22. An apparatus for sorting dead fish eggs from a container storing a batch of live and dead fish eggs, said apparatus comprising:
   means in said container for individually separating fish eggs while preserving viability of said live fish eggs from said batch,
   means operative with said separating means for injecting said separated fish eggs into a moving fluid,
   means responsive to the presence of said injected eggs in said moving fluid for detecting a dead fish egg, and
   means operative upon said detection for changing the flow direction of the portion of said moving fluid containing said dead fish egg.

23. The apparatus of claim 22 in which said changing means further comprises:
   a first receptacle for storing live fish eggs,
   a second receptacle for storing dead fish eggs,
   a Y-fluid connector having a first and second branch for connecting said moving fluid to said first receptacle over said first branch and to said second receptacle over said second branch,
   a drain, and
   a valve connected to said drain having a first input connected to said first receptacle and a second input connected to said second receptacle for controlling the direction of flow of said moving fluid, said valve being responsive to said detection for switching the direction of flow from said first receptacle to said second receptacle for the portion of said moving fluid containing said dead fish egg.

24. The apparatus of claim 22 further comprising means for determining the total number of injected fish eggs.

25. The apparatus of claim 24 in which said determining means further comprises:
   a light source,
   means connected to said light source for conveying light from said light source through said moving fluid,
   means receptive of said conveyed light after passage through said fluid for generating an electrical signal for each injected fish egg that passes through said conveyed light,
   means for storing the count of said injected fish eggs, and
   means operative upon the appearance of said signal for incrementing said storing means.

26. The apparatus of claim 25 in which said conveying means is optical fiber.

27. The apparatus of claim 25 in which said conveying means comprises:
   optical fiber for delivering the light from said light source to said moving fluid,
   means disposed between said optical fiber and said light source for concentrating said light from said light source on the input of said optical fiber, and
   means enveloping said moving fluid and the output end of said optical fiber for substantially preventing entry of any ambient light.

28. The apparatus of claim 25 in which said generating means comprises:
   means receptive of said conveyed light after passage through said fluid for generating an electrical pulse for each injected fish egg that passes through said conveyed light, and
   means operative upon the appearance of said pulses for amplifying said pulses, and
   means responsive to the amplified pulses for converting said amplified pulse into said electrical signal.

29. The apparatus of claim 25 further comprising means connected to said storing means for displaying the output of said counter.

30. An apparatus for individually injecting fish eggs from a container storing a batch of both live and dead fish ggs into a moving fluid, said apparatus comprising:
   means in said container for individually separating said eggs while preserving the viability of said live fish eggs from said batch, and
   means operative with said separating means for placing said separated eggs into said moving fluid.

31. The apparatus of claim 30 in which said separating apparatus further comprises a rotating disk disposed in the bottom of said container for collecting a plurality of fish eggs from said batch, said disk having a plurality of holes formed therein in substantially the diameter of said fish eggs for trapping individual fish eggs.

32. The apparatus of claim 31 in which said container has slanting partitions on the walls of said container for defining a hopper around disk so that said fish eggs tend to congregate above said disk.

33. The apparatus of claim 31 in which said bottom wall of said container has formed ports located under said disk for conveying some of the fluid out of said container thereby attracting fish eggs in the vicinity above said holes in said disk into said holes.

34. The apparatus of claim 31 in which said separating means further comprises:
   a motor having a drive shaft, said motor being positioned on top of said container,
   means interconnecting said drive shaft with said disk for transferring rotation from said drive shaft to said disk.

35. The apparatus of claim 34 in which said transferring means comprises:
   a slip clutch engaging said drive shaft, and
   a rod connected to said slip clutch for interconnecting said clutch with said disk.

36. The apparatus of claim 35 in which said clutch comprises:
   a coupler attached to said drive shaft for rotating with said drive shaft, said coupler slideably engaging said rod, and
   a spring attached to said rod for frictionally engaging said coupler so that the rotation of said coupler is transferred to said rod.

37. The apparatus of claim 31 in which said placing means comprises:
   a tube connected to the bottom wall of said container for conveying said moving fluid, and
   an injection chute in said bottom wall having a shallow downward ramp merging into said tube, said injection chute extending downwardly in the direction of said disk rotation.

38. The apparatus of claim 31 further comprising means for buffering the fish eggs in said batch from being thrust against the side wall of said container by the turbulence created by said rotating disk.

39. The apparatus of claim 38 in which said buffering means further comprises:
a rectangular buffering plate affixed at the upper end to said side wall and downwardly extending to a point just above said rotating disk, and
means between said side wall and said buffering plate for introducing fluid, at a point where said turbulence is the greatest, through the longitudinal narrow space formed between the upper surface of said rotating disk and the lower end of said buffering plate thereby preventing fish eggs from being thrust against said side wall.

40. An apparatus for sorting live fish eggs into a first receptacle and dead fish eggs into a second receptacle from a container storing a batch of fish eggs, said container being connected in fluid communication with said first and second receptacles, said apparatus comprising:
a tube connecting the bottom of said container at one end and having a Y-branch at the other end for connecting to said receptacles, said Y-branch having a first leg connecting to said first receptacle and a second leg connecting to said second receptacle,
means for delivering fluid into said container, through said tube, and out from said receptacles,
a disk disposed above the bottom wall of said container over said tube connection for injecting a plurality of fish eggs from said batch into the fluid flowing in said tube, said disk having a plurality of evenly spaced holes formed along a circumference disposed therein in substantially the diameter of said fish eggs for trapping individual fish eggs, and said disk having a thickness substantially equal to the diameter of said fish eggs,
means connected to said container for rotating said disk,
means affixed to said tube responsive to the presence of said injected eggs for detecting a dead fish egg, and
a hydraulic valve having a first input connected to said first receptacle and a second input connected to said second receptacle for controlling the direction of flow of said fluid, said valve being responsive to said detection for switching the direction of flow from said first receptacle to said second receptacle for the portion of said moving fluid conveying said dead fish egg.

41. The apparatus of claim 40 further comprising:
means located in the bottom wall of said container for draining some of said fluid in said container, and
said bottom wall having ports formed therein underneath said disk for delivery of some of said fluid in said container through said plurality of holes in said disk and into said draining means, so that the fish eggs above said holes are drawn into said holes by the flow of said fluid from said container into said draining means.

42. The apparatus of claim 40 in which said bottom wall forms an arcuate injection chute extending downwardly in the direction of said disk rotation along a path corresponding to the rotation of said plurality of holes for merging and connecting to said tube.

43. The apparatus of claim 40 wherein said bottom wall is formed with inclined side partitions downwardly extending from the side walls of said container and converging around a rectangular bottom portion over which said disk is disposed so that said fish eggs congregate above said disk.

44. The method of sorting dead fish eggs from a container storing a batch of both live and dead fish eggs, said method comprising the steps of:
individually injecting fish eggs from said batch into a moving fluid,
detecting a dead fish egg in the moving fluid, and
diverting the flow of the portion of the moving fluid containing the dead fish egg.

45. The method of claim 44 in which the step of individually injecting fish eggs into the moving fluid further comprises the steps of:
delivering some of the fluid in the container through holes of a selector disk and into a drain thereby trapping individual fish eggs in each hole,
passing each hole of the selector disk containing a trapped fish egg over an injection chute, and
delivering the fluid in the container into the injection chute thereby injecting the trapped fish egg into the moving fluid.

46. The method of claim 44 in which the step of detecting a dead fish egg further comprises the steps of:
conveying the moving fluid containing the injected fish eggs through a beam of light,
generating from the light intensity variations of each injected egg passing through the beam a first signal for a dead fish egg and a second signal for a live fish egg, and
delivering the first and second signals to a discriminator for detection and amplification of only the second signal.

47. The method of claim 44 in which the step of diverting the flow of fluid comprises the additional steps of:
directing the moving fluid into a first receptacle thereby depositing live fish eggs therein, and
directing the portion of the moving fluid containing a dead egg into a second receptacle when a dead egg is detected thereby depositing dead fish eggs therein.

48. The method of individually injecting fish eggs from a container storing a batch of fish eggs into a moving fluid, said method comprising the steps of:
delivering a portion of the fluid in the container over fish eggs above a selector disk having holes formed therein and through the holes of the selector disk and into a drain, thereby trapping individual fish eggs in each hole,
passing each hole of the selector disk containing a trapped fish egg over an injection chute, and
delivering the fluid in the container into the injection chute thereby injecting the trapped fish egg into the fluid moving down the chute.

* * * * *